3,161,494
KILLING OF GRASSES AND CONTROL
OF CRAB GRASS
Paul F. Warner, Phillips, and Bradford L. Archer and Richard D. Franz, Borger, Tex., assignors to Phillips Petroleum Company, a corporation of Delaware
No Drawing. Original application Aug. 14, 1959, Ser. No. 833,697, now Patent No. 3,064,025, dated Nov. 13, 1962. Divided and this application Mar. 2, 1962, Ser. No. 176,900
11 Claims. (Cl. 71—2.4)

This invention relates to killing of grasses and control of crab grass. In one of its aspects, the invention relates to a composition for selective control of undesired grass, for example, crab grass in a Bermuda grass lawn, said composition containing a heavy metal cyanide addition product or compound of an alkyl thioether and/or an alkyl dithioether. In another of its aspects, the invention relates to the application or use of a heavy metal cyanide addition product or compound of an alkyl thioether and an alkyl dithioether to control or to kill an undesired grass, for example, to selectively kill or control crab grass in a lawn, such as a Bermuda grass lawn.

This application is a divisional of Serial Number 833,697, filed by us August 14, 1959, now Patent Number 3,064,025. In said patent, there is set forth, described and claimed, the preparation of a heavy metal cyanide addition product of an alkyl thioether and an alkyl dithioether, i.e., a cuprous cyanide addition product of an alkyl thioether or alkyl dithioether in which the alkyl group contains 1–12 carbon atoms.

The cuprous cyanide addition compounds of di-n-butyl sulfide and 2,5-dithiahexane have been prepared by adding the cyanide to the thioether. The additions have been made at room temperature. The cuprous n-butyl sulfonium cyanide is a viscous oil with a greenish tint and the 2,5-dithiahexane-cuprous cyanide product is a white powder.

It is an object of the present invention to provide a crab grass herbicide, more especially a selective crab grass killer for killing crab grass in Bermuda grass lawns. It is another object of the invention to provide a method for killing crab grass, more especially crab grass in a Bermuda grass lawn.

Other aspects, objects and the several advantages of the invention are apparent from the present disclosure and the appended claims.

The alkyl thioethers and the alkyl dithioethers, as exemplified by di-n-butyl sulfide and 2,5-dithiahexane, respectively, which are included within the scope of the present invention are those which contain 1 to 12 carbon atoms in the alkyl group. The alkyl group can be a primary, secondary, or tertiary alkyl group. The dithioethers which contain sulfur attached to terminal carbon atoms, as in 2,5-dithiahexane, are now preferred.

Thus, according to the present invention, an addition compound of a heavy metal cyanide, as herein described, is applied, also as herein described, to control crab grass in a Bermuda grass lawn. Thus, according to the invention, there is provided a method for killing crab grass, especially as it can be selectively killed in a Bermuda grass lawn, by applying to said crab grass, an effective amount of an addition compound of the invention such as 2,5-dithiahexane-CuCN.

*Example I*

*Herbicide tests.*—The 2,5-dithiahexane-cuprous cyanide addition product was formulated according to the following tabulation:

| Formulation | 1 | 2 | 3 | 4 |
|---|---|---|---|---|
| 2,5-Dithiahexane-CuCN_____gm___ | 2 | 3 | 4 | 5 |
| Ammonium nitrate_____gm___ | 40 | 40 | 40 | 40 |
| DAC [1]_____gm___ | 10 | 10 | 10 | 10 |
| Triton X-171 [2]_____gm___ | 0.5 | 0.5 | 0.5 | 0.5 |
| Triton B-1956 [2]_____gm___ | 0.5 | 0.5 | 0.5 | 0.5 |

[1] Deoiled aromatic concentrate obtained from effluent of normal butane cracking furnace.
[2] Emulsifiers.

Water was added to make 1 pint of spray material. The entire pint was applied to 1 square yard of Bermuda grass infested with crab grass. The adjoining grass was used as control. The amounts of 2,5-dithiahexane-cuprous cyanide compound used correspond to 20, 30, 40, and 50 pounds per acre. One week after application, the crab grass in the sprayed plots was 100 percent killed at all concentrations of the 2,5-dithiahexane-cuprous cyanide addition product while the Bermuda grass was not injured. The ammonium nitrate and DAC appear to enhance the herbicidal value of the spray. They are not effective herbicides in their own right, however, unless applied at much higher concentration. Then their action is of a non-selective nature. Thus, in a test, as in the following example, 2,5-dithiahexane-cuprous cyanide gave no conclusive result.

*Example II*

2,5-dithiahexane-cuprous cyanide was applied alone as a herbicide. It was mixed with kaolin clay and applied as a dust to one square yard of crab grass infested Bermuda at a rate of application corresponding to 50 pounds per acre. The grass was sprinkled lightly with water before application of the dust. After one week, very little effect was noted to either the crab grass or the Bermuda.

*Example III*

(a) Ammonium nitrate was applied as a solution in water at a concentration of 40 (4 grams/pint water) pounds per acre to crab grass infested Bermuda. Triton X-100 was used as a wetting agent. After two weeks both grasses were unharmed; each was growing rapidly, having a rich brilliant green color.

(b) DAC (deoiled aromatic, 15 grams/pint of water, concentrate obtained from effluent of dehydrogenation of hydrocarbons, e.g., ethane, propane and butane) was applied as an emulsion in water at a concentration of 150 pounds per acre to crab grass infested Bermuda. Nalcamine G-11 was used as the emulsifying agent. After two weeks, both the crab grass and the Bermuda grass were chlorotic and apparently badly injured. Obviously, the wetting agent and emulsifying agent are not active and others available can be used in lieu thereof.

It is noteworthy that the addition compounds of the present invention are herbicidal in character and that 2,5-dithiahexane-cuprous cyanide compound is a very good selective herbicide for crab grass control in Bermuda grass lawns. Cuprous n-butyl sulfonium cyanide is less selective at same application rates than the 2,5-dithiahexane-cuprous cyanide and tends to injure the Bermuda grass when a kill of crab grass of 90 percent is obtained.

The heavy metals, the cyanides of which are to be included when considering this disclosure, are: copper, zinc, silver, gold, mercury, lead, cadmium, nickel, cobalt, palladium, platinum and barium.

The compounds now preferred to be used in the method of the invention include the 2,5-dithiahexane-cuprous cyanide addition product and cuprous di-n-butyl sulfonium cyanide.

Reasonable variation and modification are possible within the scope of the foregoing disclosure, and the appended claims to the invention, the essence of which is that there have been provided a composition and a method for control of an undesired grass, e.g., crab grass in a Bermuda grass lawn, the composition containing a quantity of an addition product, herein described, such that upon application of the composition, an amount of the addition product effective to kill or selectively control the crab grass will contact the same, in certain now-preferred modifications, the compositions also containing ammonium nitrate and/or a deoiled aromatic concentrate obtained as described.

We claim:

1. A method for selective control of crab grass in a Bermuda grass lawn which comprises applying thereto in an amount effective to give said control an addition product of a heavy metal cyanide and a compound selected from the group consisting of alkyl thioethers and alkyl dithioethers in which any alkyl group contains 1–6 carbon atoms, said control being accomplished by applying with said addition product both ammonium nitrate and a deoiled aromatic concentrate obtained from effluent of dehydrogenation of hydrocarbons in an amount effective to enhance the action of the addition product.

2. A method for the selective control of crab grass in a Bermuda grass lawn which comprises applying to the lawn, in an amount effective to give said control, 2,5-dithiahexanecuprous cyanide addition product, said control being accomplished by applying with said addition product both ammonium nitrate and a deoiled aromatic concentrate obtained from effluent of dehydrogenation of hydrocarbons in an amount effective to enhance the action of the 2,5-dithiohexane-cuprous cyanide.

3. A method for the selective control of crab grass in a Bermuda grass lawn which comprises applying to the lawn, in an amount effective to give said control, cuprous di-n-butyl sulfonium cyanide, said control being accomplished by applying with said di-n-butyl sulfonium cyanide both ammonium nitrate and a deoiled aromatic concentrate obtained from effluent of dehydrogenation of hydrocarbons in an amount effective to enhance the action of the di-n-butyl sulfonium cyanide.

4. A composition comprising an addition product of a heavy metal cyanide and a compound selected from the group consisting of an alkyl thioether and an alkyl dithioether in which the alkyl contains 1–6 carbon atoms, ammonium nitrate, a deoiled aromatic concentrate obtained from the effluent of a normal butane-cracking furnace, and an emulsifier, said addition product being present in an amount effective upon application to selectively control crab grass.

5. A composition comprising 2,5-dithiahexane-cuprous cyanide addition product, ammonium nitrate, a deoiled aromatic concentrate obtained from the effluent of a normal butane-cracking furnace, and an emulsifier, the addition product being present in an amount effective upon application to selectively control crab grass.

6. A composition comprising di-n-butyl sulfide-cuprous cyanide addition product, ammonium nitrate, a deoiled aromatic concentrate obtained from the effluent of a normal butane-cracking furnace, and an emulsifier, said addition product being present in an amount effective upon application to selectively control crab grass.

7. A method for killing grass which comprises applying thereto in an amount effective to kill said grass an addition product of a heavy metal cyanide and a compound selected from the group consisting of alkyl thioethers and alkyl dithioethers in which any alkyl group contains 1–6 carbon atoms, said killing being enhanced by applying an effective amount of ammonium nitrate and a deoiled aromatic concentrate obtained from the effluent of a normal butane-cracking furnace.

8. A method for selective control of crab grass in a Bermuda grass lawn which comprises applying thereto in an amount effective to give said control, an addition product of a heavy metal cyanide and a compound selected from the group consisting of alkyl thioethers and alkyl dithioethers in which any alkyl group contains 1–6 carbon atoms, the heavy metal being selected from the group consisting of copper, zinc, silver, gold, mercury, lead, cadmium, nickel, cobalt, palladium, platinum and barium, said control being accomplished by applying with said addition product both ammonium nitrate and a deoiled aromatic concentrate obtained from the effluent of the dehydrogenation of hydrocarbons in an amount effective to enhance the action by the addition product.

9. A composition comprising an addition product of a heavy metal cyanide and a compound selected from the group consisting of an alkyl thioether and an alkyl dithioether in which the alkyl contains 1–6 carbon atoms, a herbicidal adjuvant and an emulsifier, the heavy metal being selected from the group consisting of copper, zinc, silver, gold, mercury, lead, cadmium, nickel, cobalt, palladium, platinum and barium, ammonium nitrate and a deoiled aromatic concentrate obtained from effluent of dehydrogenation of hydrocarbons, said addition product being present in an amount effective upon application to selectively control crab grass.

10. A composition comprising an addition product of a heavy metal cyanide and a compound selected from the group consisting of an alkyl thioether and an alkyl dithioether in which the alkyl contains 1–6 carbon atoms, ammonium nitrate and a deoiled aromatic concentrate obtained from effluent of dehydrogenation of hydrocarbons, said addition product being present in an amount effective upon application to act as a killer of crab grass.

11. A composition comprising an addition product of a heavy metal cyanide and a compound selected from the group consisting of an alkyl thioether and an alkyl dithioether in which the alkyl contains 1–6 carbon atoms, a herbicidal adjuvant, an emulsifier, ammonium nitrate and a deoiled aromatic concentrate obtained from the effluent of a normal butane cracking furnace, in an amount effective to enhance the action of the product, said addition product being present in an amount effective upon application to selectively control crab grass.

References Cited in the file of this patent
UNITED STATES PATENTS
2,993,923    Warner et al. _____ July 25, 1961